(12) United States Patent
Somnay et al.

(10) Patent No.: US 6,729,072 B1
(45) Date of Patent: May 4, 2004

(54) INTEGRAL LATCH AND DRIVE SYSTEM FOR A POWERED SLIDING DOOR

(75) Inventors: Rajesh J. Somnay, Troy, MI (US); Steven J. Engelgau, Royal Oak, MI (US); Shelley Lynn Bess, Royal Oak, MI (US); Christopher Matthew Radjewski, Sterling Heights, MI (US); Ian Christopher Hoare, W. Bloomfield, MI (US); Joseph Allen Wilbanks, II, Hermitage, TN (US); Silvio M. Yamada, Waterford, MI (US)

(73) Assignee: ArvinMeritor Technology LLC, Troy, MI (US)

( * ) Notice: Subject to any disclaimer, the term of this patent is extended or adjusted under 35 U.S.C. 154(b) by 0 days.

(21) Appl. No.: 10/387,771

(22) Filed: Mar. 13, 2003

(51) Int. Cl.$^7$ .............................. E05F 11/34; B60J 5/06
(52) U.S. Cl. ............................ 49/362; 296/155; 49/279; 292/144; 292/DIG. 23; 74/29

(58) Field of Search .......................... 296/155, 146.4; 49/362, 358, 360, 279; 292/DIG. 23, 144; 74/29

(56) References Cited

U.S. PATENT DOCUMENTS

| | | | |
|---|---|---|---|
| 5,909,918 A | * | 6/1999 | Kowalewski et al. ........ 292/199 |
| RE36,428 E | * | 12/1999 | Moore et al. ................ 296/155 |
| 6,250,013 B1 | * | 6/2001 | Apprich ...................... 49/362 |
| 2002/0153744 A1 | * | 10/2002 | Long et al. .................. 296/155 |

* cited by examiner

Primary Examiner—Joseph D. Pape
(74) Attorney, Agent, or Firm—Carlson, Gaskey & Olds

(57) ABSTRACT

A vehicle door lock system comprises a sliding vehicle door, having a door path of travel generally translational to a vehicle frame. A drive unit moves the vehicle door along a door path. A drive component communicates the movement from the drive unit to the vehicle door by moving along a drive component path of travel. A latch is selectively actuated to arrest movement of the drive component and the vehicle door by blocking the drive component path of travel.

18 Claims, 2 Drawing Sheets

INTEGRAL LATCH AND DRIVE SYSTEM FOR A POWERED SLIDING DOOR

BACKGROUND OF THE INVENTION

This invention relates to a latch system for a sliding door found on a vehicle, such as a truck or van.

A truck or van may employ a sliding door that permits access to the passenger or cargo compartment of the vehicle. In the past, these sliding doors had been manually operated. Recently, sliding door systems have been developed that open the sliding door automatically at the touch of a button. These systems typically involve a drive system in the sliding door that moves the door between its open and closed positions.

Automatic sliding doors have inherited the latch systems found on manual sliding doors. Specifically, the latch system involves a lock distinct and apart from the drive system for the sliding door. When the sliding door is locked, the drive system for the sliding door is disabled from operation.

Because the sliding door system is separate and distinct from the latch system, the vehicle requires more components to operate both the drive system for the sliding door and the lock system. The higher number of components further results in increased costs for these two systems. Moreover, the security offered by existing latch systems for automatic sliding doors is no greater than that offered by manual doors.

A need therefore exists for a simplified latch and drive system for a powered sliding door that offers fewer components and greater security than existing systems.

SUMMARY OF THE INVENTION

The inventive vehicle door latch system has a drive unit that powers the movement of the vehicle door between its open and closed positions. A drive component serves to transfer power from the drive unit to the vehicle door. Rather than employ a separate latch system, the inventive door latch system employs a latch that selectively arrests movement of the drive component and the vehicle door by preventing movement of the drive component and accordingly the vehicle door.

The drive component may be blocked by the latch, which may comprise a pawl or a bolt. A pinion may serve as the drive component and transfer movement from the drive unit to the vehicle door by rotating along a rack attached to the vehicle frame. The latch may interfere with the movement of the drive component by entering the path of a component's movement. Accordingly, the latch is moved to a point of interference with the path of the drive component to lock the door.

The vehicle door may be a sliding door and travel along a path generally longitudinally to a vehicle frame. The drive unit serves to move the vehicle door along its path while a latch selectively arrests movement of the drive component so as to stop movement of the coupled vehicle door. In this way, the sliding door is prevented from moving.

A vehicle door is thus moved by a drive component of a drive unit. The movement of the drive component is selectively interrupted by having a locking member enter the path of movement of the drive component. The vehicle door may be stopped in place until the locking member is removed from the path of the drive component. Because the latch is incorporated as part of the drive system, fewer parts are required. Moreover, the latch interferes with the operation of the drive system for the vehicle door, thereby providing better vehicle security.

DETAILED DESCRIPTION OF THE PREFERRED EMBODIMENT

Figure 1:
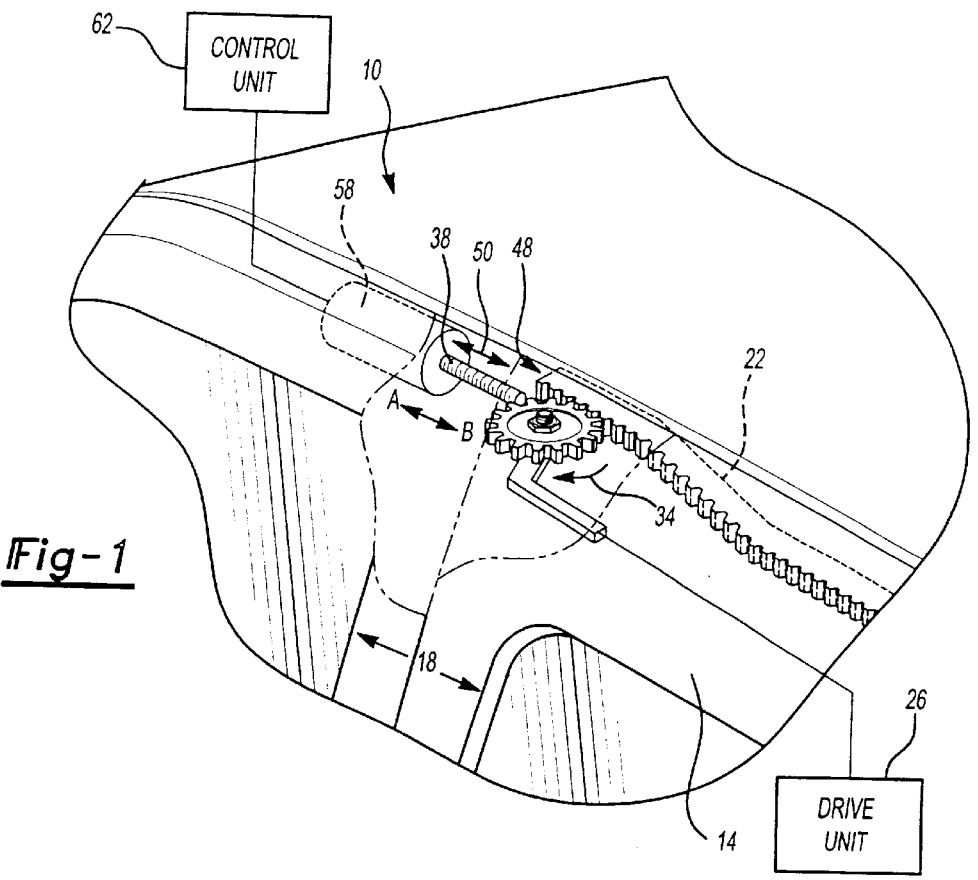
FIG. 1 illustrates an overhead view of the inventive door latch, illustrating a drive unit, a drive component, and a latch.

FIG. 1 illustrates a mechanism used to move a sliding door along a vehicle frame. Like existing systems, the powered sliding door illustrated comprises sliding vehicle door 14 that travels along door path 18, which is generally longitudinal to vehicle frame 22. As known, vehicle door 14 is powered by drive unit 26, schematically shown, using drive component 30 to transfer movement from drive unit 26 to vehicle door 14. Drive component 30, a pinion, rotates along drive component path of travel 34, moving drive component 30 along rack 48 of vehicle frame 22 along door path 18.

In contrast to existing systems, vehicle door latch 10 has latch 38, which arrests movement of drive component 30 and accordingly sliding door 14. Latch 30 may comprise a bolt or pawl or other device to interfere with the movement of drive component 30. Latch 38 interferes with the movement of drive component 30 by entering drive component path of travel 34. Latch 38 is shown extended into drive component path of travel 34 so as to prevent rotation of a pinion 30 along rack 48.

Figure 3:
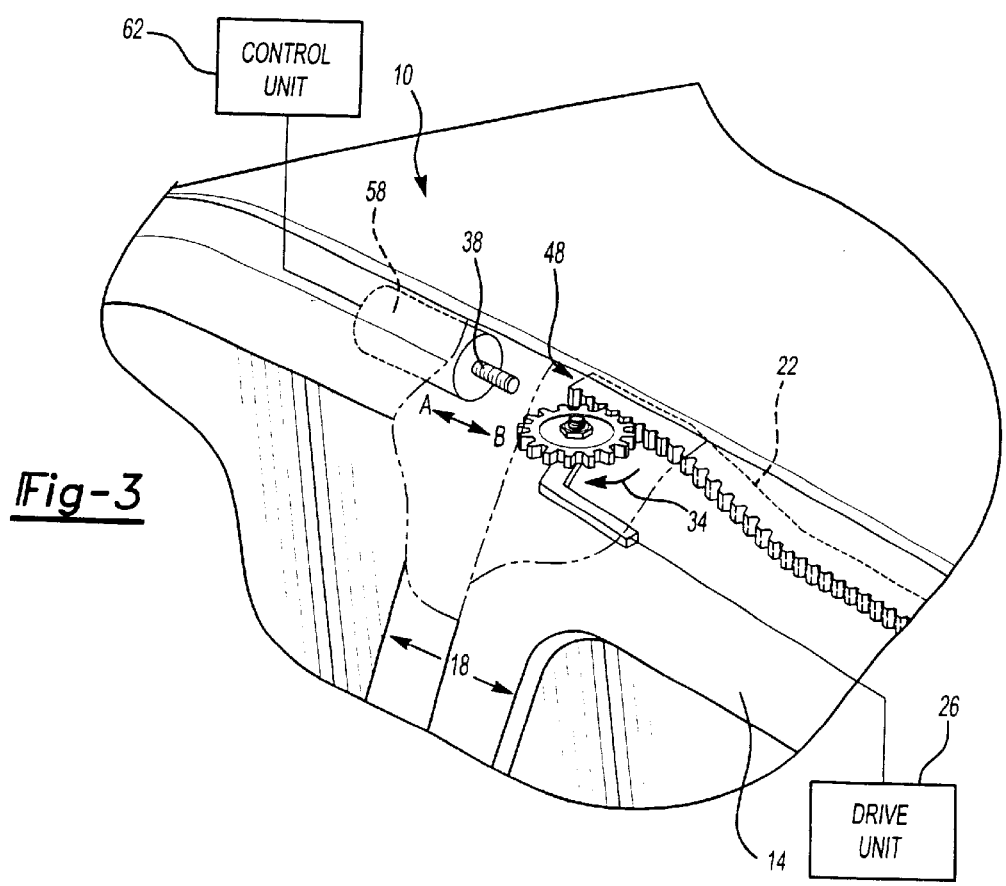
FIG. 3 illustrates the vehicle door latch of FIG. 1 in an unlatched position.

Actuator 58, such as a solenoid actuator, selectively moves latch 38 from a locked position shown in FIG. 1 to an unlocked position shown in FIG. 3. That is, latch 38 may have a path of travel 50 as shown in FIG. 1. As shown in FIGS. 1 and 3, actuator may move latch 38 in the direction of arrow A or in the direction of arrow B of path 50. Control unit 62 is in communication with actuator 58 so as to control movement of latch 38 into the locked position shown in FIG. 1 or the unlocked position shown in FIG. 3. The locked position of FIG. 1 is accomplished by moving latch 38 from the unlocked position of FIG. 3 along the direction of arrow A into drive component path of travel 34. This locked position shown in FIG. 1 may be maintained until control unit 62 receives a command from a vehicle operator to unlock vehicle door 14. When this command is received by control unit 62, actuator 58 retracts latch 38 along the direction of arrow B. Drive component 30 is then free to move and rotate along drive component path of travel 34. Thus, when latch 38 reaches a location of interference 54, i.e., the intersection of latch path of travel 50 and drive component path of travel 34, drive component 30 is prevented from movement and vehicle door 14 is maintained in place.

Figure 2:
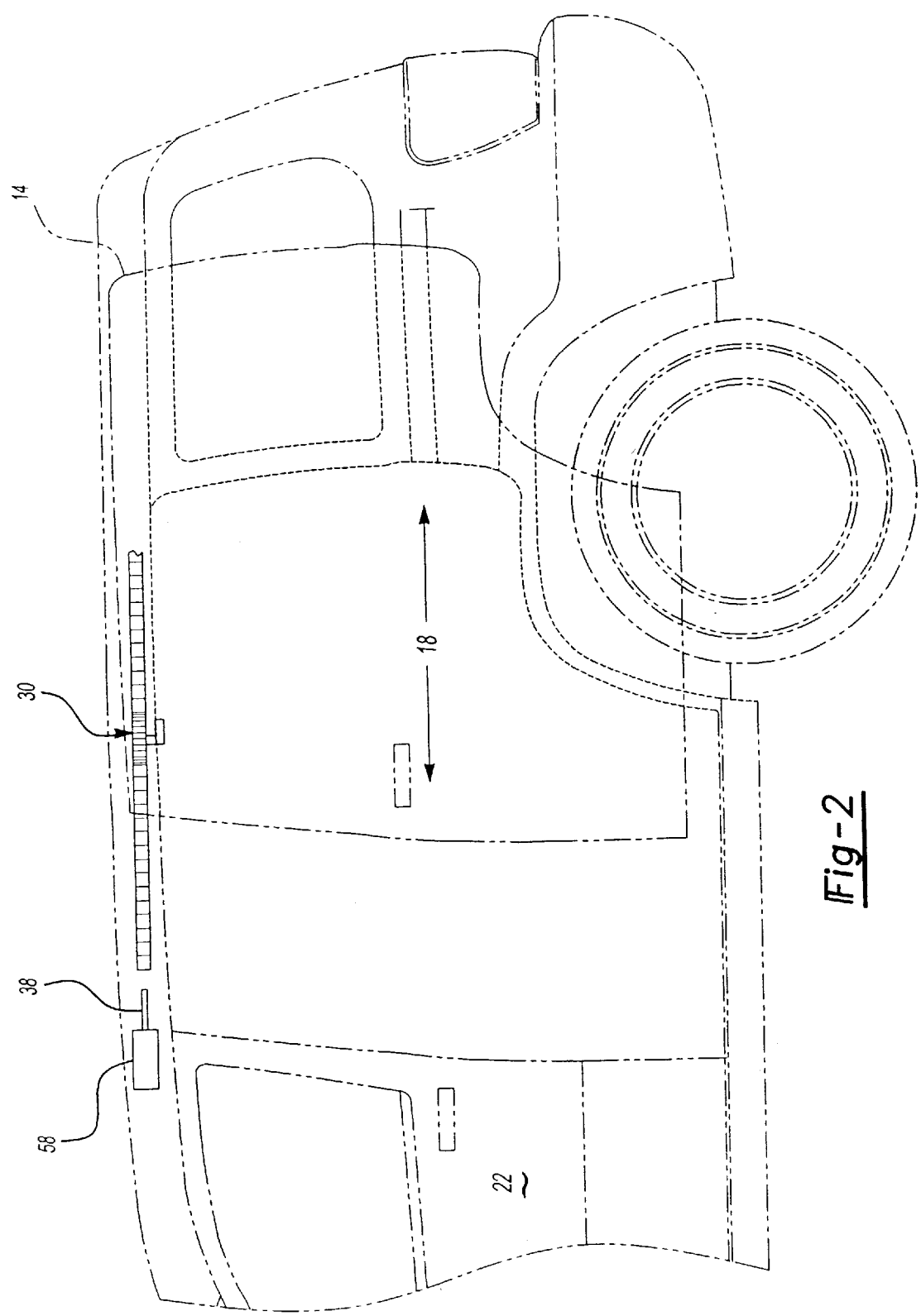
FIG. 2 illustrates a side view of the vehicle door latch of FIG. 1 mounted on a vehicle.

FIG. 2 illustrates vehicle door latch 10 as used in a vehicle, here shown as a van with sliding door 14, which moves along door path of travel 18. As shown, latch 38 and actuator 58 are mounted to vehicle frame 22. Sliding door 14 has drive component 30, which serves to move vehicle door 14 in conjunction with drive unit 26 (shown in FIG. 1) from its open and closed positions. When vehicle door 14 is in its closed position, latch 38 may interfere with movement of drive component 30 depending upon whether latch 38 is in the extended locked position of FIG. 1 or the retracted, unlocked position of FIG. 3.

Although a preferred embodiment of this invention has been disclosed, a worker in this art would recognize that modifications would come within the scope of this invention. For that reason the following claims should be studied to determine the true scope and content of this invention.

What is claimed is:

1. A vehicle door latch system, comprising;

a drive unit for moving a vehicle door;

a drive component for communicating movement from said drive unit to the vehicle door by moving along a drive component path of travel; and a latch selectively actuable to arrest movement of said drive component by blocking said drive component path of travel.

2. The vehicle door latch system of claim 1 wherein said latch comprises a pawl and said drive component comprises a pinion.

3. The vehicle door latch system of claim 2 including a rack in communication with said pinion.

4. The vehicle door latch system of claim 1 wherein said latch comprises a bolt.

5. The vehicle door latch system of claim 1 wherein said drive component rotates along said drive component path of travel.

6. The vehicle door latch system of claim 1 wherein said latch has a latch path of travel, said drive component path of travel and said latch path of travel intersecting at an intersection location to arrest movement of said drive component.

7. A vehicle door latch system, comprising;

a drive unit for moving a vehicle door;

a drive component communicating movement from said drive unit to the vehicle door by moving along a drive component path of travel; and a latch selectively actuable to arrest movement of said drive component by blocking said drive component path of travel wherein said latch has a latch path of travel, said drive component path of travel and said latch patch of travel intersecting at an intersection location to arrest movement of said drive component.

8. The vehicle door latch system of claim 7 wherein said latch comprises a pawl and said drive component comprises a pinion.

9. The vehicle door latch system of claim 8 including a rack in communication with said pinion.

10. The vehicle door latch system of claim 7 wherein said latch comprises a bolt.

11. The vehicle door latch system of claim 7 wherein said drive component rotates along said drive component path of travel.

12. The vehicle door latch system of claim 7 including a vehicle door having a door path of travel, said door path of travel generally translational to a vehicle frame.

13. A method of locking a vehicle door, comprising the steps of:

moving a vehicle door through a drive component of a drive unit, the drive component communicating movement between the drive unit and the vehicle door along a drive component path;

selectively interrupting movement of the drive component and the vehicle door by entering the drive component path with a selectively actuated locking member; and arresting movement of the vehicle door until the locking member is removed from the path of the drive component.

14. The method of locking the vehicle door of claim 13 herein the vehicle door has a door path of travel, the door path of travel generally translational to a vehicle frame.

15. The vehicle door latch system of claim 13 wherein interrupting the drive component path of travel comprises blocking the drive component path of travel.

16. The vehicle door latch system of claim 13 wherein the locking member comprises a pawl and the drive component comprises a pinion.

17. The vehicle door latch system of claim 13 wherein the locking member comprises a bolt.

18. The vehicle door latch system of claim 13 wherein the locking member travels along a latch path of travel, the drive component path of travel and the latch path of travel intersecting at an intersection location to arrest movement of the drive component.

* * * * *